United States Patent [19]

Hamstra et al.

[11] Patent Number: 5,760,078

[45] Date of Patent: Jun. 2, 1998

[54] PROCESS FOR THE FRACTIONING AND RECOVERY OF VALUABLE COMPOUNDS FROM VINASSE PRODUCED IN FERMENTATIONS

[75] Inventors: Reinder Sietze Hamstra, Pijnacker; Peter Johannes Schoppink, Amsterdam, both of Netherlands

[73] Assignee: Gist-Brocades B.V., Netherlands

[21] Appl. No.: 625,597

[22] Filed: Apr. 3, 1996

[30] Foreign Application Priority Data

Mar. 8, 1996 [EP] European Pat. Off. ............ 962000596
Mar. 14, 1996 [EP] European Pat. Off. ............ 96200708

[51] Int. Cl.$^6$ ..................... A23B 4/03; A61K 31/675; A01N 37/30; C12N 1/20
[52] U.S. Cl. ..................... 514/556; 162/8; 210/600; 426/7; 426/51; 426/54; 426/443; 435/255.1; 435/813; 504/101; 510/123; 514/77
[58] Field of Search ..................... 435/163, 168, 435/813, 255.1; 210/600, 601; 562/856, 513, 898; 426/7, 54, 443, 51; 162/8; 424/70.28, 719, 405; 510/123; 514/77, 556; 504/101

[56] References Cited

U.S. PATENT DOCUMENTS

| | | | |
|---|---|---|---|
| 4,357,358 | 11/1982 | Schanze | 426/62 |
| 4,359,430 | 11/1982 | Heikkilä et al. | 260/501.13 |
| 4,402,989 | 9/1983 | Krasnobajew | 426/536 |
| 4,421,856 | 12/1983 | Muller et al. | 435/161 |
| 4,604,125 | 8/1986 | Robertiello et al. | 71/26 |
| 4,781,928 | 11/1988 | Shen | 426/69 |
| 4,931,278 | 6/1990 | Blost et al. | 424/195.1 |
| 5,127,957 | 7/1992 | Heikkilä et al. | 127/47 |
| 5,369,122 | 11/1994 | Steinmetzer | 514/423 |
| 5,384,035 | 1/1995 | Smolnik et al. | 210/635 |
| 5,641,495 | 6/1997 | Jokura et al. | 424/401 |

FOREIGN PATENT DOCUMENTS

| | | |
|---|---|---|
| 1377487 | 9/1964 | France . |
| 1497480 | 10/1967 | France . |
| 2573088 | 11/1984 | France . |
| 9600775 | 1/1996 | WIPO . |
| WO9600776 | 1/1996 | WIPO . |

*Primary Examiner*—Leon B. Lankford, Jr.
*Assistant Examiner*—Deborah K. Ware
*Attorney, Agent, or Firm*—Bierman, Muserlian and Lucas

[57] ABSTRACT

A process is provided for the preparation of valuable products from vinasse which contains potassium salts. The process comprises concentrating the vinasse to a dry matter content of 50-80% dry solids and separating the formed crystals in a concentration step to form a supernatant which is free of potassium salts. Ammonium sulphate is added to the vinasse before or during concentrating the vinasse.

Furthermore, clarification of the supernatant is carried out to provide for the separation of betaine, PCA, succinic acid or citric acid. Filtration, or microfiltration is used for the clarification and a chromatographic separation is used for the separation of betaine as well as the other products. Potassium salts are obtained from the crystals to provide for a fertilizer.

10 Claims, No Drawings

PROCESS FOR THE FRACTIONING AND RECOVERY OF VALUABLE COMPOUNDS FROM VINASSE PRODUCED IN FERMENTATIONS

FIELD OF THE INVENTION

The present invention relates to a process for the fractioning and recovery of valuable compounds from vinasse produced in fermentations.

STATE OF THE ART

Molasse e.g. beet molasse is generally used in fermentation industries for the production of e.g. baker's yeast, alcohol and citric acid, amino adds and antibiotica. The remainder after the fermentation is generally concentrated by evaporation or distillation and the concentrate is generally mentioned 'vinasse' or condensed molasse solubles. This vinasse is used as fertilizer or if the potassium content is reduced to acceptable levels, as feed ingredient.

In recent years an additional possibility has been investigated vi7. the feasibility of isolating components with added value present, especially betaine. Examples hereof are disclosed In U.S. Pat. Nos .4,359,430 and 5,127,957.

In these processes to recover these valuable compounds from fermentation waste water, chromatographic separation is the preferred purification step.

Tho critical stop in this operation is the elimination of suspended solids (yeast cells, yeast debris and other particulate matter) from the feed stream to the chromatographic separator.

For the treatment of stillage obtained from alcohol fermentations (EP-A-411780), microfiltration is described as the clarification step. The microfiltration of concentrated vinasse (>50% dry solids) is not feasible due to low fluxes, low yield and membrane fouling and therefore clarification has to be conducted at a relatively dilute stream and subsequent chromatography has to process large volumes, making this process unattractive.

Another disadvantage of the microfiltration is the high investments associated because fluxes usually are small and operation and maintenance is costly.

Another example of the clarification of fermentation waste water is given in WO 96/00775. Here dilute vinasse Is clarified by passing it through a high efficiency centrifuge. The clarified, dilute vinasse is concentrated by evaporation (50–80% dry solids). During evaporation potassium salts/crystals are being formed which can be separated from the vinasse by decantation, filtration or a combination of these processes.

A drawback of the process desribed in WO 96/00775 is the formation of precipitates (irreversible) during evaporation of the vinasse, which makes a second clarification after decantation of the potassium salt crystals necessary as is described in WO 96/00775. In addition, the crystallization of potassium salt is still rather uncontrollable, giving rise to heterogenous crystal growth and size and consequently troublesome solid/liquid separation of the crystal fraction. These problems were only partly solved by the addition of an acid such as sulphuric acid.

SUMMARY OF THE INVENTION

According to the present invention a novel process is disclosed for clarifying and reducing the potassium concentration of fermentation waste water before it is applied to a chromatography step.

Furthermore, the present invention relates to a significantly increased control of the potassium salt crystallization and clarification is possible in one clarification step in contrast to the two steps indicated in WO96/00775.

According to the present invention a process is disclosed for the preparation of valuable products from vinasse which contains potassium salts which comprises concentrating the vinasse to a dry matter content of 50–80% dry solids and separating the formed crystals In the concentration step to form a supernatant which is substantially free of potassium salts, and whereby ammonium sulphate is added to the vinasse before or during concentrating the vinasse.

Preferably the potassium content of the supernatant is lower than 3.5% w/w. Also other suspended solids are removed in the separation step and the sediment in the supernatant is reduced in this way to less than 4% w/w.

At the end of fermentation, yeast is separated by conventional solid/ liquid separation and the residual waste water and washing water is collected. This waste stream usually contains a number of high valuable compounds, be it in relatively low concentrations.

DESCRIPTION OF THE PREFERRED EMBODIMENTS

According to a preferred embodiment, an effective amount of ammonium sulphate is added to the waste stream before or during evaporation. In general 2 to 15 g of ammonium sulphate, preferably 5 to 10 g of ammonium sulphate is added per liter of waste stream having a dry matter content of 5%.

The amount will in general depend on the concentration of the potassium in the waste stream. In an other waste stream having a different DS content, the amount of ammonium sulphate will be increased or decreased proportional to the different potassium and/or sulfate content already present. The waste stream (or remainder after fermentation) can be evaporate, preferably by a multi-effect evaporator to a dry matter content of 50–85% DS (dry solids) preferably 65–78% Ds.

During evaporation the potassium salts crystallize in a controlled manner (homogeneous crystal growth) and the crystal fraction can be separated from the concentrate by conventional solid/liquid separation techniques like decantation.

The emerging potassium salt fraction can be stabilized and used as a fertilizer or fertilizer ingredient. Advantageously the potassium salt fraction Is stabilized to prevent sedimentation by a viscosity regulating agent. Preferably a gum is used, more preferably xanthane gum. Suitably 0.01 to 1% (w/w), preferably 0.025 to 0.1% (w/w) of xanthane gum is added to the potassium salt fraction. The addition of the viscosity regulating agent improves the pumpability of the suspension. We have found that also in prior art processes, in which no ammonium sulphate is added, the separated potassium salt fraction can be stabilized with the use of the viscosity regulating agent according to the invention.

The supernatant or filtrate (vinasse) is now suitable to be used in animal feed because of the low potassium concentration.

The vinasse still contains valuable compounds like betaine, PCA, succinic acid, citric acid, etc., depending on the raw materials and fermentation process under consideration.

These valuable products can be separated by using chromatographic processes. In which case the vinasse has to be clarified. The clarified vinasse is substantially free of particles larger than 5 μm. more preferably 0.5 μm. Clarification can be performed by standard solid-liquid separation processes like microfiltration and filtration.

In case of standard dead-end filtration, a precoat filtration and/or body feed results in high filtration rates and a clarified vinasse suitable as a feed to chromatographic separations. By using this feed in a chromatographic separation, a fraction which contains substantial amounts of betaine is obtained.

EXAMPLE 1

After the fermentation of 'bakers yeast' at commercial scale, the yeast was recovered by centrifugation and washing. The remainder (dilute vinasse) was collected and ammonium sulphate was added as a 40% saturated solution. The amount added was 10–25 g/l dilute vinasse at 6% dry solids.

The dilute vinasse was concentrated by a multi-effect evaporator till a concentrate of 72% dry solids. At about 40% dry solids, crystallization was started.

The concentrated crystal slurry was decanted by a KHD decantor at 3000 g and a temperature of 80° C., The salt fraction (92% dry solids) was stabilized for unwanted sedimentation by adding 0.05% xanthan gum.

The vinasse after decantation (65% dry solids) was clarified by using a membrane filterpress using Celite super cel as a precoat and body feed (3% w/w).

The clarified vinasse obtained in this manner was subjected to chromatographic separation. Pressure drop, resin capacity and separation characterisics remained constant over a period of 4 weeks.

We claim:

1. A process for the preparation of one or more products from vinasse containing potassium salts which comprises: concentrating the vinasse containing potassium salts to a dry matter content of 50 to 80% dry solids adding ammonium sulfate to the vinasse before or during concentrating, separating crystals formed during the concentrating to form a supernatant which is free of potassium salts; and recovering said supernatant and/or said crystals as said one or more products.

2. The process according to claim 1, in which evaporation is used for the concentrating of the vinasse.

3. The process according to claim 1, which centrifugation is used for the separating of the formed crystals.

4. The process according to claim 1, which further comprises clarification of the supernatent and separation of betaine, PCA, succinic acid or citric acid from the clarified supernatent.

5. The process according to claim 4 in which filtration and/or microfiltration is used for the clarification.

6. The process according to claim 4 in which a chromatographic separation is used for the separation of betaine, PCA, succinic acid or citric acid.

7. The process of claim 1 wherein said formed crystals are recovered to provide the products.

8. The process of claim 7 wherein potassium salts are obtained from the crystals to provide a fertilizer containing the potassium salts.

9. The process of claim 8 wherein said potassium salts are stabilized by a viscosity regulating agent.

10. The process of claim 9 wherein the regulating agent is xanthan.

* * * * *